(12) United States Patent
Kawai

(10) Patent No.: US 11,332,047 B2
(45) Date of Patent: May 17, 2022

(54) SLIDE DEVICE

(71) Applicant: SHIROKI CORPORATION, Fujisawa (JP)

(72) Inventor: Yasunori Kawai, Fujisawa (JP)

(73) Assignee: SHIROKI CORPORATION, Fujisawa (JP)

( * ) Notice: Subject to any disclaimer, the term of this patent is extended or adjusted under 35 U.S.C. 154(b) by 226 days.

(21) Appl. No.: 16/816,405

(22) Filed: Mar. 12, 2020

(65) Prior Publication Data

US 2020/0376985 A1 Dec. 3, 2020

(30) Foreign Application Priority Data

May 28, 2019 (JP) .............................. JP2019-099481

(51) Int. Cl.
*B60N 2/07* (2006.01)
*B60N 2/00* (2006.01)

(52) U.S. Cl.
CPC .............. *B60N 2/07* (2013.01); *B60N 2/002* (2013.01)

(58) Field of Classification Search
CPC .... B60N 2/0722; B60N 2/0232; B60N 2/067; B60N 2/07; B60N 2/0818; B60N 2/002; B60N 2002/024; B60N 2002/0236
USPC ....................................... 248/424, 425, 429
See application file for complete search history.

(56) References Cited

U.S. PATENT DOCUMENTS

| | | | | |
|---|---|---|---|---|
| 7,189,931 B2 * | 3/2007 | Hida | ...................... | B60N 2/002 177/144 |
| 7,487,687 B2 * | 2/2009 | Sumi | ...................... | B60N 2/002 73/862.391 |
| 7,490,523 B2 * | 2/2009 | Sakamoto | .............. | B60N 2/002 73/862.391 |
| 7,555,960 B2 * | 7/2009 | Nakano | .................. | B60N 2/002 73/781 |
| 7,559,249 B2 * | 7/2009 | Nakano | .................. | B60N 2/002 73/781 |
| 8,258,413 B2 * | 9/2012 | Ito | ........................ | G01G 3/1402 177/136 |
| 9,389,116 B2 * | 7/2016 | Aoyama | ............. | B60R 21/0152 |
| 9,400,206 B2 * | 7/2016 | Aoyama | ................ | G01G 19/08 |
| 9,857,251 B2 * | 1/2018 | Seo | ....................... | B60N 2/0732 |
| 2003/0106723 A1 * | 6/2003 | Thakur | ................ | G01G 23/002 177/144 |

(Continued)

FOREIGN PATENT DOCUMENTS

JP 2017154533 A 9/2017

*Primary Examiner* — Nkeisha Smith

(74) *Attorney, Agent, or Firm* — Buchanan Ingersoll & Rooney PC

(57) ABSTRACT

Provided is a slide device which includes: a lower rail; an upper rail movably attached to the lower rail; a load sensor attached to the upper rail by a first attachment member; and a bracket attached to the load sensor by a second attachment member. The bracket has an insertion hole into which the first attachment member is inserted, a deformation suppressing member is attached to a tip end portion of the first attachment member, the first attachment member has a first bolt and a first nut screwed onto the first bolt, the tip end portion of the first attachment member is positioned on a tip end side of the first bolt with respect to the first nut, and the deformation suppressing member is configured to reduce deformation of the bracket in a direction of separating from the upper rail.

5 Claims, 8 Drawing Sheets

(56) References Cited

U.S. PATENT DOCUMENTS

| | | | |
|---|---|---|---|
| 2009/0064792 A1* | 3/2009 | Kawabata | B60N 2/002 |
| | | | 73/781 |
| 2009/0126500 A1* | 5/2009 | Ito | G01L 1/2231 |
| | | | 73/781 |
| 2017/0246966 A1 | 8/2017 | Hayashi | |
| 2018/0334058 A1* | 11/2018 | Nagatani | B60N 2/0705 |

* cited by examiner

SLIDE DEVICE

CROSS-REFERENCE TO RELATED APPLICATION

This application claims priority from Japanese Patent Application No. 2019-099481 filed with the Japan Patent Office on May 28, 2019, the entire content of which is hereby incorporated by reference

BACKGROUND

1. Technical Field

The present disclosure relates to a slide device.

2. Related Art

A slide device including an upper rail slidable on a lower rail has been known. For example, JP-A-2017-154533 describes a slide device including an upper rail slidable on a lower rail.

As illustrated in FIG. 9, a slide device 50 includes a load sensor 52 attached to an upper rail 51, and a bracket 53 attached to the load sensor 52. The load sensor 52 is attached to the upper rail 51 with two pairs of first bolts 54 and first nuts 55. The bracket 53 is attached to the load sensor 52 with a second bolt 56 and a second nut 57. A bolt 58 is attached to a rear end portion of the upper rail 51. The bracket 53 has an insertion hole 53a into which the bolt 58 is inserted. A tubular member 59 having a flange portion 59a is attached to the bolt 58 by means of a nut 60. The diameter of the flange portion 59a is greater than the inner diameter of the insertion hole 53a. When a load is applied to the bracket 53 in the direction of separating from the upper rail 51, the flange portion 59a of the tubular member 59 comes into contact with an upper surface of the bracket 53. This reduces deformation of the bracket 53.

SUMMARY

A slide device according to an embodiment of the present disclosure includes: a lower rail; an upper rail movably attached to the lower rail; a load sensor attached to the upper rail by a first attachment member; and a bracket attached to the load sensor by a second attachment member. The bracket has an insertion hole into which the first attachment member is inserted, a deformation suppressing member is attached to a tip end portion of the first attachment member, the first attachment member has a first bolt and a first nut screwed onto the first bolt, the tip end portion of the first attachment member is positioned on a tip end side of the first bolt with respect to the first nut, and the deformation suppressing member is configured to reduce deformation of the bracket in a direction of separating from the upper rail.

DETAILED DESCRIPTION

Figure 1:
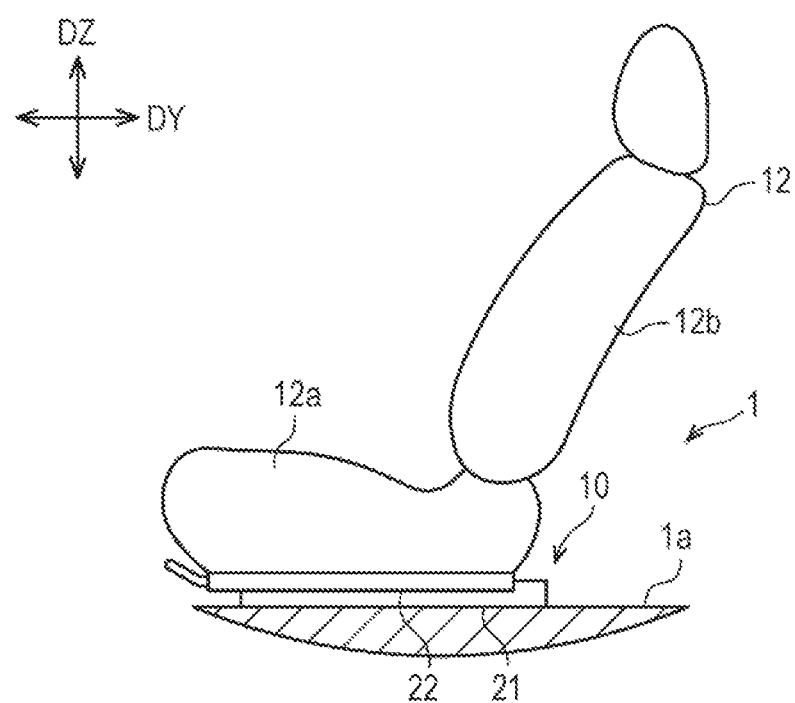
FIG. 1 is a schematic view of a seat slide apparatus.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the slide device 50 described in JP-A-2017-154533, the bolt 58 is attached to a position on a rear end side with respect to the load sensor 52 on the upper rail 51. Thus, the slide device 50 has such a problem that the dimension of the slide device 50 in a longitudinal direction of the upper rail 51 tends to be great. The present disclosure has been made for such a situation. An object of the present disclosure is to provide a slide device having a decreased dimension in a longitudinal direction of an upper rail.

In order to solve the above-described problem, a slide device includes: a lower rail; an upper rail movably attached to the lower rail; a load sensor attached to the upper rail by a first attachment member; and a bracket attached to the load sensor by a second attachment member. The bracket has an insertion hole into which the first attachment member is inserted, a deformation suppressing member is attached to a tip end portion of the first attachment member, the first attachment member has a first bolt and a first nut screwed onto the first bolt, the tip end portion of the first attachment member is positioned on a tip end side of the first bolt with respect to the first nut, and the deformation suppressing member is configured to reduce deformation of the bracket in a direction of separating from the upper rail.

According to the above-described configuration, the deformation suppressing member is attached to the first attachment member. Thus, the deformation suppressing member can be attached utilizing an existing member of the slide device. Consequently, the dimension of the slide device in a longitudinal direction of the upper rail can be decreased as compared to an aspect including another member provided for attaching the deformation suppressing member. Moreover, after the load sensor position-determined on the upper rail has been attached using the first attachment member, the bracket and the deformation suppressing member can be attached. Thus, position determination of the load sensor on the upper rail can be suitably performed.

It is preferred that, in the slide device, the deformation suppressing member includes a bag nut having a non-penetrating screw hole screwed onto the first bolt. According to this configuration, a terminal end of the screw hole of the bag nut can be utilized for position determination of the deformation suppressing member on the first attachment member. Thus, the deformation suppressing member can be easily attached to a proper position.

It is preferred that, in the slide device, the deformation suppressing member includes a nut having a penetrating screw hole screwed onto the first bolt. According to this configuration, the tip-end-side position of the first bolt in the screw hole can be checked from the outside. Thus, a screwing state of the deformation suppressing member can be easily checked.

It is preferred that, in the slide device, the load sensor is attached to at least one end side of the upper rail in a longitudinal direction thereof, and the first attachment member is positioned on one end side of the upper rail in the longitudinal direction thereof with respect to the second attachment member. In this slide device, at a portion of the load sensor, which is at each end portion, from the second attachment member to one end of the upper rail in the longitudinal direction thereof, a greater load is more likely to be applied to the bracket in the direction of separating from the upper rail. Moreover, the deformation suppressing member is attached to the first attachment member positioned on one end side of the second attachment member in the longitudinal direction of the upper rail. Thus, deformation of the bracket can be more suitably reduced.

According to the slide device of the present disclosure, the dimension of the slide device in the longitudinal direction of the upper rail can be decreased.

A slide device 10 will be described with reference to FIGS. 1 to 8C. The slide device 10 is a component of a seat slide apparatus 1. The seat slide apparatus 1 includes a pair of slide devices 10. The pair of slide devices 10 slidably supports a seat 12 of a vehicle. The seat 12 includes a seat cushion 12a and a seat back 12b rotatable attached to the seat cushion 12a.

Figure 2:
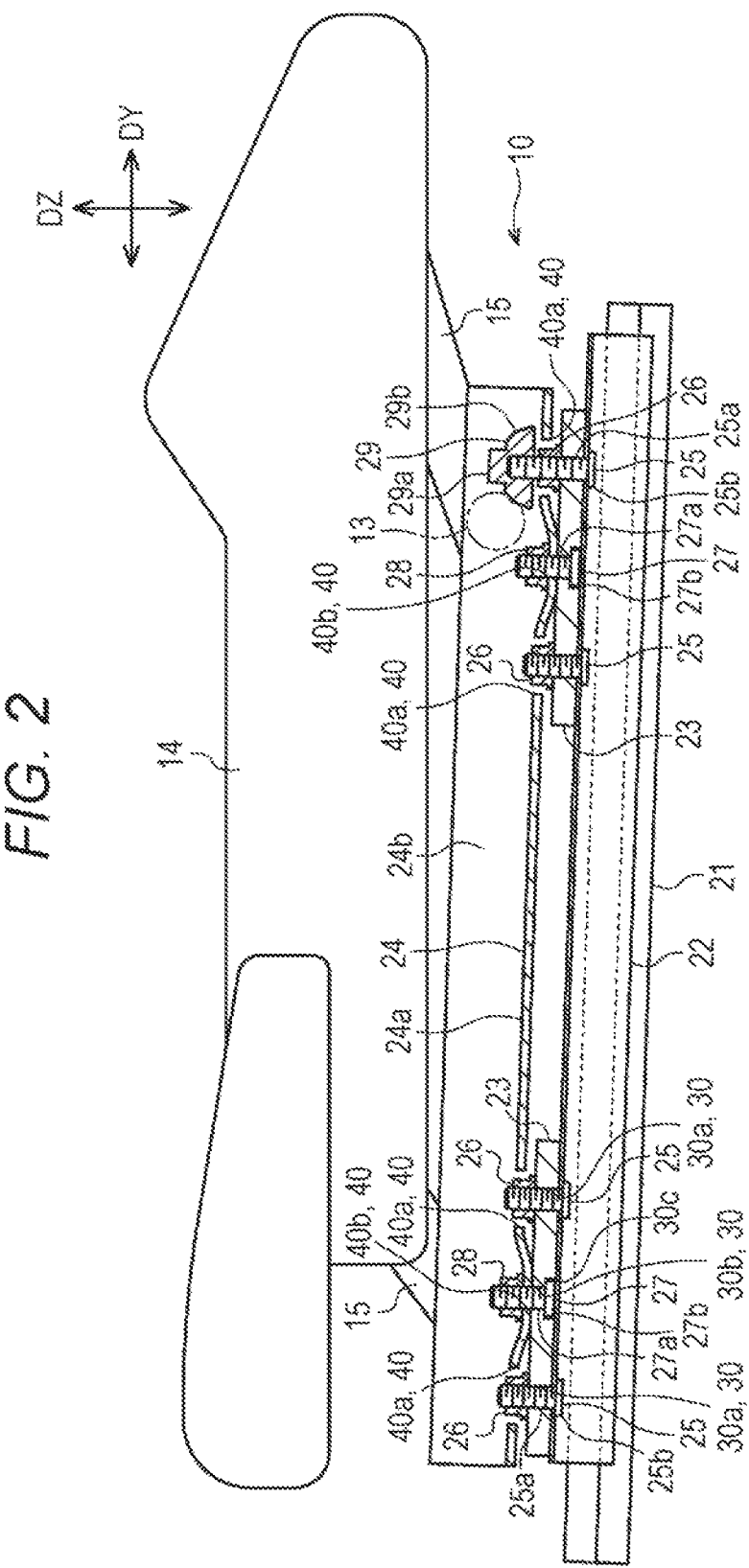
FIG. 2 is a sectional view of a slide device.

As illustrated in FIGS. 1 and 2, the slide device 10 has a lower rail 21, an upper rail 22, load sensors 23, and a bracket 24. A belt anchor 13 for fixing a seat-belt (not shown) and a link 15 configured to support a cushion 14 holding the seat cushion 12a such that the height of the cushion frame 14 is adjustable are attached to the bracket 24.

Figure 3:
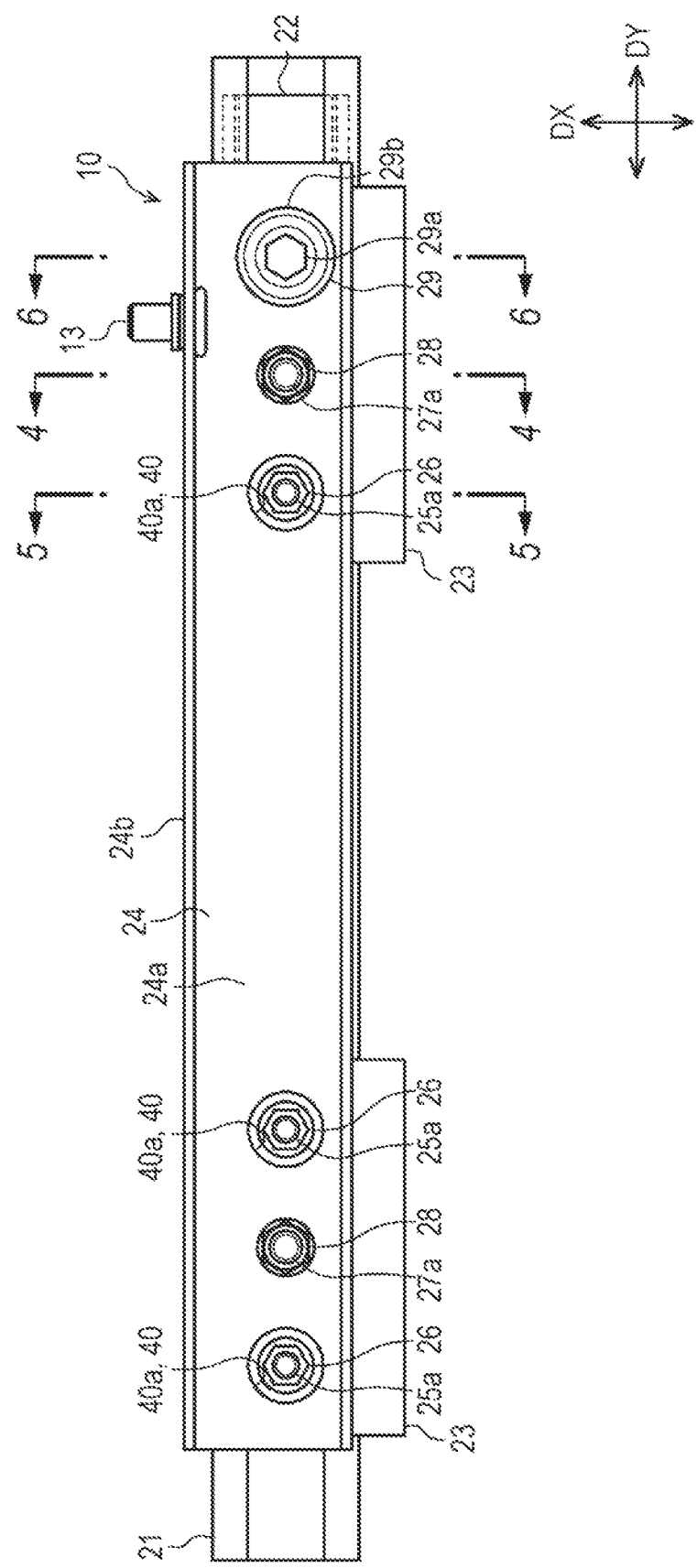
FIG. 3 is a plan view of the slide device.

As illustrated in FIGS. 2 and 3, the load sensors 23 are each attached to two end portions of the upper rail 22 in a longitudinal direction thereof with first bolts 25 and first nuts 26 screwed onto the first bolts 25, the first bolts 25 and the first nuts 26 being provided as first attachment members. In other words, the load sensors 23 are each attached to one end side and the other end side of the upper rail 22 in the longitudinal direction thereof. The first bolts 25 and the first nuts 26 are provided in parallel in the longitudinal direction of the upper rail 22. Each load sensor 23 has two pairs of first bolts 25 and first nuts 26.

The bracket 24 is attached to the load sensors 23 with second bolts 27 and second nuts 28 screwed onto the second bolts 27, the second bolts 27 and the second nuts 28 being provided as second attachment members. The second bolt 27 and the second nut 28 are arranged between two pairs of first bolts 25 and first nuts 26. The bracket 24 has insertion holes 40 into which the first bolts 25 and the first nuts 26 are inserted. Neither the first bolts 25 nor the first nuts 26 contact the bracket 24. Thus, the bracket 24 is attached to the load sensors 23 only with the second bolts 27 and the second nuts 28. With this configuration, a load applied to the bracket 24 can be suitably detected by the load sensors 23.

As illustrated in FIG. 2, the first bolt 25 and the second bolt 27 each include shaft portions 25a, 27a and head portions 25b, 27b. The head portion 25b, 27b is provided on a base end side as a one-end-side end portion of the shaft portion 25a, 27a. Further, the head portion 25b, 27b protrudes in a radial direction of the shaft portion 25a, 27a. A screw groove is formed at the outer periphery of the shaft portion 25a, 27a. Moreover, a screw groove is also formed at the inner periphery of each of the first nut 26 and the second nut 28. The first bolt 25 and the first nut 26 are screwed to each other through the screw grooves. Similarly, the second bolt 27 and the second nut 28 are screwed to each other through the screw grooves.

A bag nut 29 as a later-described deformation suppressing member is attached to a tip end portion of the rear-side first bolt 25 for the load sensor 23 attached to a rear end side of the upper rail 22 as one end side of the upper rail 22. Specifically, the bag nut 29 is attached to a position on a tip end side of the first nut 26 at the shaft portion 25a of the first bolt 25. The tip end portion of the first bolt 25 as described herein means an end portion of the shaft portion 25a of the first bolt 25 opposite to a head portion 25b side.

The slide device 10 further includes the first bolts 25, the first nuts 26, the second bolts 27, the second nuts 28, and the bag nut 29.

Of the slide device 10 placed on a vehicle floor 1a, a direction along a vehicle front-rear direction will be herein referred to as a "front-rear direction DY," a direction along a vehicle width direction will be herein referred to as a "width direction DX," and a direction along a vehicle upper-lower direction will be herein referred to as an "upper-lower direction DZ." As viewed in FIG. 1, the left is the front in the front-rear direction DY, and the right is the rear in the front-rear direction DY. As facing the front of the vehicle, the left is the left in the width direction DX, and the right is the right in the width direction DX.

Note that the front-rear direction DY of the slide device 10 is coincident with the longitudinal directions of the lower rail 21 and the upper rail 22 of the slide device 10. Moreover, the upper-lower direction DZ is a direction perpendicular to both of the front-rear direction DY and the width direction DX.

Hereinafter, the lower rail 21, the upper rail 22, the load sensors 23, the bracket 24, and the bag nut 29 on the right side in the width direction DX will be described. The lower rail 21, the upper rail 22 the load sensors 23, the bracket 24, and the bag nut 29 on the left side in the width direction DX have shapes symmetrical to those of the members described below in the right-left direction.

The lower rail 21 will be described.

Figure 4:
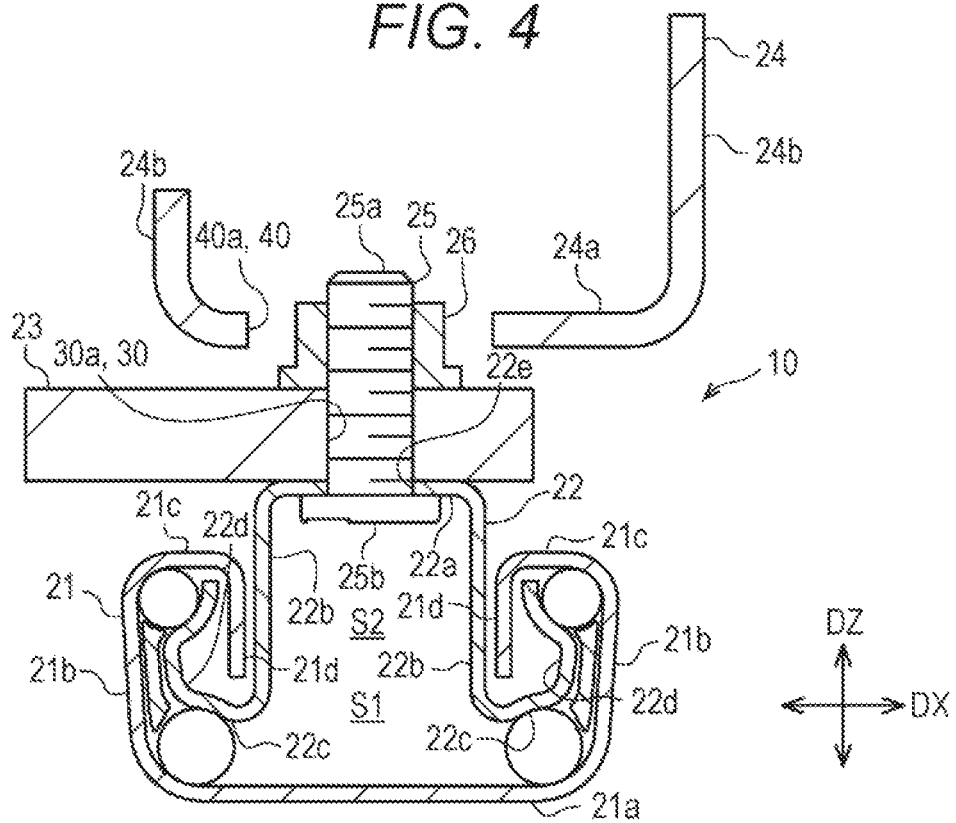
FIG. 4 is a sectional view along a 4-4 line of FIG. 3.

As illustrated in FIG. 4, the lower rail 21 includes a plate-shaped bottom wall 21a fixed to the vehicle floor. The bottom wall 21a has, at two end portions in the width direction DX, side walls 21b extending upward along the upper-lower direction DZ. Each of the side walls 21b in a pair has, at an end portion opposite to a bottom wall 21a side, a horizontal wall 21c extending inward of the bottom wall 21a in the width direction DX. Each of the horizontal walls 21c in a pair has, at an end portion opposite to a side wall 21b side, a vertical wall 21d extending downward along the upper-lower direction DZ. These vertical walls 21d in a pair are arranged with a spacing therebetween, thereby forming a clearance between the vertical walls 21d. The lower rail 21 has an internal space S1 defined by the bottom wall 21a, the pair of side walls 21b, the pair of horizontal walls 21c, and the pair of vertical walls 21d. The internal space S1 communicates, in the upper-lower direction DZ, with an external space through the clearance between the vertical walls 21d.

The upper rail 22 will be described.

As illustrated in FIG. 4, the upper rail 22 includes a plate-shaped top wall 22a extending in parallel to the vehicle floor. The top wall 22a has, at each of two end portions in a longitudinal direction thereof, two attachment holes 22e to which the first bolts 25 are attached. Two attachment holes 22e are provided in parallel in the longitudinal direction of the top wall 22a. The top wall 22a has, at two end portions in the width direction DX, side walls 22b extending downward along the upper-lower direction DZ. Each of the sidewalls 22b in a pair has, at an end portion opposite to a top wall 22a side, a horizontal wall 22c extending outward of the top wall 22a in the width direction DX. Each of the horizontal walls 22c in a pair has, at an end portion opposite to a side wall 22b side, a vertical wall 22d extending upward along the upper-lower direction DZ. The upper rail 22 has an internal space S2 defined by the top wall 22a and the pair of side walls 22b.

The upper rail 22 is attached to the lower rail 21 in such a manner that the pair of horizontal walls 22c is inserted into the internal space S1 of the lower rail 1 through the clearance between the vertical walls 21d of the lower rail 21 in a pair. That is, the upper rail 22 is attached to the lower rail 21 to move relative to the lower rail 21. In the state of the lower rail 21 to which the upper rail 22 is attached, the horizontal walls 22c of the upper rail 22 and the horizontal walls 21c of the lower rail 21 are arranged at positions overlapping with each other in the upper-lower direction DZ. With this configuration, detachment of the upper rail 22 from the lower rail 21 in the upper-lower direction DZ is reduced.

The load sensor 23 will be described.

As illustrated in FIGS. 2 to 4, the load sensor 23 has a substantially rectangular plate shape having a pair of long sides and a pair of short sides. The load sensor 23 has, on a center side in a transverse direction of the load sensor 23, three through-holes 30 along a longitudinal direction. Of three through-holes 30, the center through-hole 30 functions as a second through-hole 30b through which the second bolt 27 penetrates. The remaining two through-holes 30 function as first through-holes 30a through which the first bolts 25 penetrate. That is, the load sensor 23 has two first through-holes 30a and one second through-hole 30b. An interval between two first through-holes 30a is set substantially equal to an interval between the attachment holes 22e provided at the upper rail 22. The second through-hole 30b has an enlarged-diameter portion 30c. The second through-hole 30b is configured so that the head portion 27b of the second bolt 27 can be housed in the enlarged-diameter portion 30c. That is, the second through-hole 30b is configured so that protrusion of the head portion 27b of the second bolt 27 from the load sensor 23 can be reduced upon penetration of the second bolt 27 through the second through-hole 30b.

The "substantially rectangular plate shape having a pair of long sides and a pair of short sides" as described herein does not mean only a quadrangular plate shape. Such a substantially rectangular plate shape includes substantially rectangular plate shapes as a whole, such as a rectangular plate shape in which at least part of long sides and short sides is curved and a quadrangular plate shape having curved corner portions.

The bracket 24 will be described.

As illustrated in FIGS. 2 to 4, the bracket 24 includes an attachment wall 24a extending in the longitudinal direction of the upper rail 22. Each of two end portions of the attachment wall 24a in the width direction DX is provided with a support wall 24b extending upward along the upper-lower direction DZ. Of the pair of support walls 24b, the right support wall 24b in the width direction DX is attached to the belt anchor 13 and the link.

The length of the attachment wall 24a in the front-rear direction DY is slightly shorter than the length of the upper rail 22 in the same direction. The attachment wall 24a has, at each of two end portions in a longitudinal direction, three insertion holes 40 along the longitudinal direction of the attachment wall 24a. Of three insertion holes 40, the center insertion hole 40 functions as a second insertion hole 40b into which the second bolt 27 is inserted. The remaining two insertion holes 40 function as first insertion holes 40a into which the first bolts 25 and the first nuts 26 are inserted in non-contact with the attachment wall 24a. An interval between two first insertion holes 40a sandwiching the second insertion hole 40b is substantially equal to the interval between the attachment holes 22e provided at the upper rail 22 and the interval between the first through-holes 30a of the load sensor 23.

As illustrated in FIG. 4, the inner diameter of the first insertion hole 40a is configured greater than the diameters of the first bolt 25 and the first nut 26. With this configuration, contact of the first bolt 25 and the first nut 26 inserted into the first insertion hole 40a with the inner periphery of the first insertion hole 40a is reduced.

Figure 5:
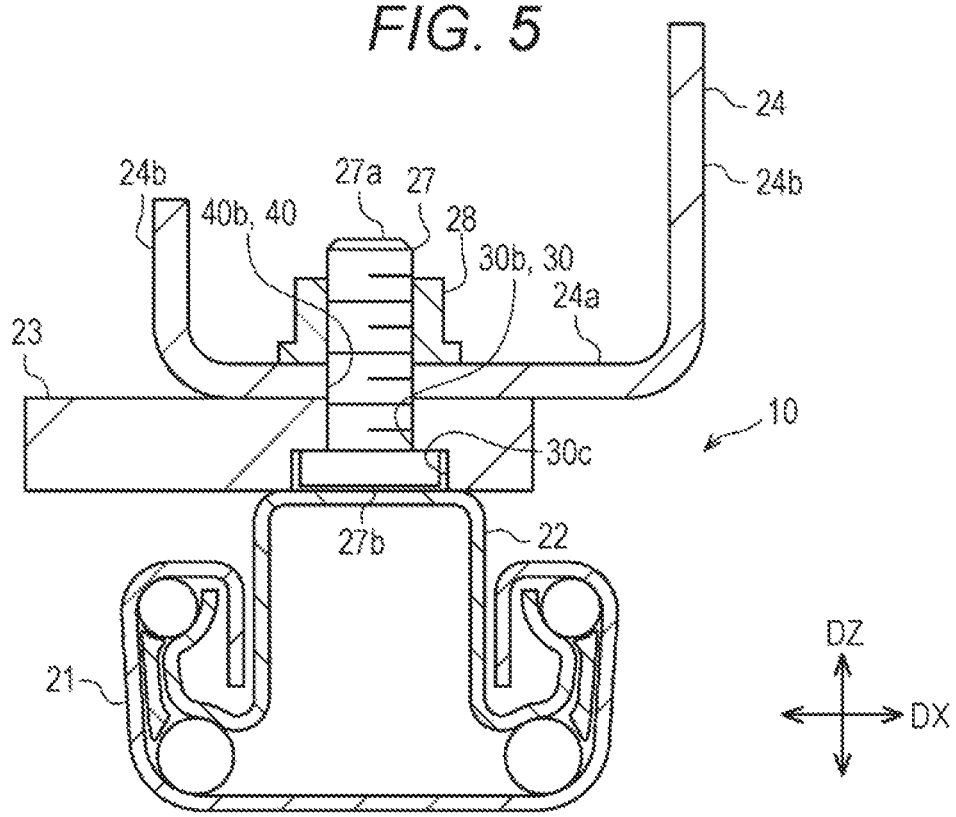
FIG. 5 is a sectional view along a 5-5 line of FIG. 3.

As illustrated in FIG. 5 the inner diameter of the second insertion hole 40b is smaller than the diameter of the second nut 28. With this configuration, the second nut 28 is screwed onto the second bolt 27 inserted into the second insertion hole 40b. Thus, the load sensor 23 and the bracket 24 can be sandwiched.

As illustrated in FIG. 2, a portion of the attachment wall 24a around the second insertion hole 40b protrudes in a thickness direction of the attachment wall 24a. Specifically, the portion of the attachment wall 24a around the second insertion hole 40b is curved downward in the upper-lower direction DZ. With this configuration, only the portion of the attachment wall 24a around the second insertion hole 40b can contact, as described later, the load sensor 23 when the bracket 24 is attached to the load sensor 23.

The deformation suppressing member will be described.

Figure 6A:
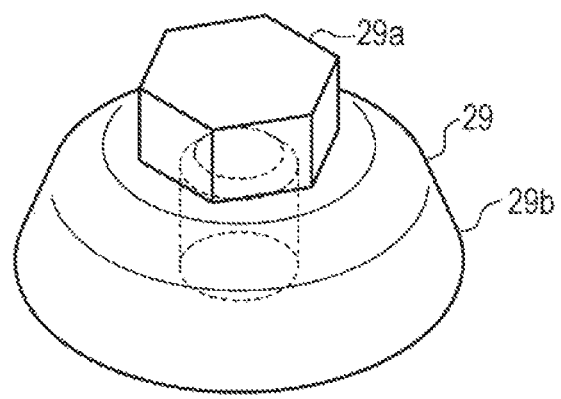
FIG. 6A is a perspective view of a deformation suppressing member.
Figure 6B:
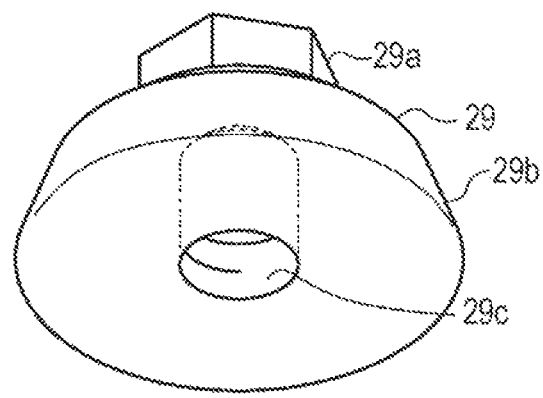
FIG. 6B is a perspective view of the deformation suppressing member from another angle.
Figure 6C:
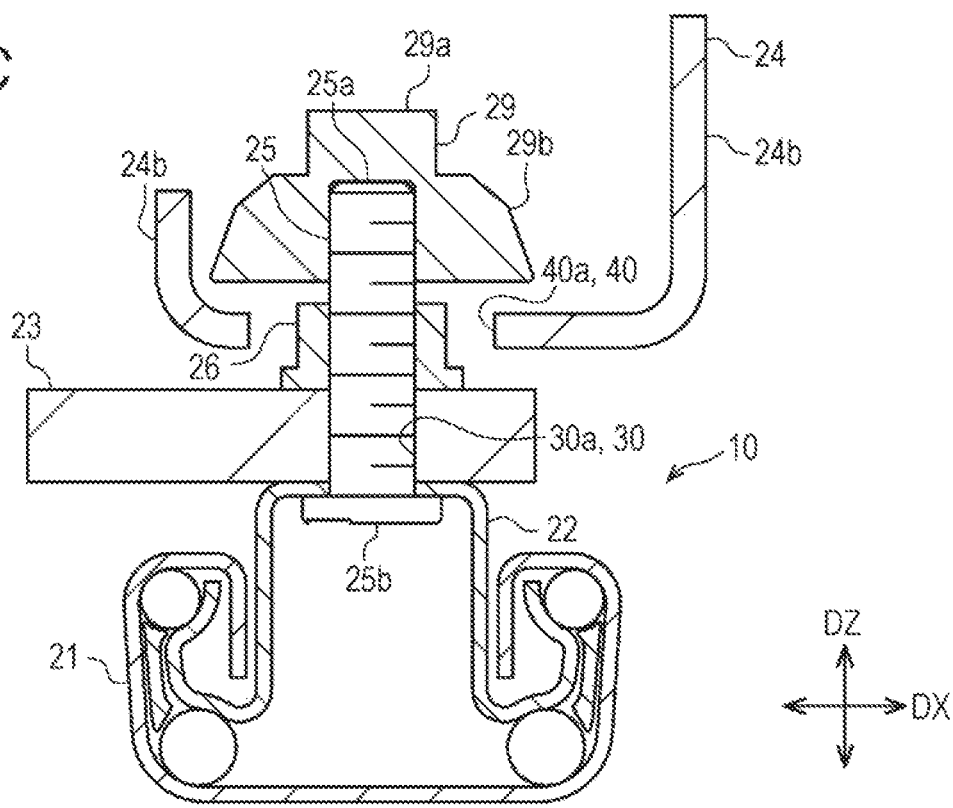
FIG. 6C is a sectional view along a 6-6 line of FIG. 3.

As illustrated in FIGS. 6A to 6C, the bag nut 29 is used as the deformation suppressing member. The bag nut 29 includes a columnar body portion 29a and a flange portion 29b protruding outward in a radial direction of the body portion 29a. As viewing the bag nut 29 laterally, the flange portion 29b protrudes in a substantially fan shape from a surface of the body portion 29a. In other words, the dimension of outward protrusion of the flange portion 29b in the radial direction increases toward one end side of the body portion 29a of the bag nut 29. That is, the flange portion 29b is, as a whole, formed in a mushroom pile us shape. Moreover, the flange portion 29b is configured such that a lower surface thereof is substantially flush with a lower surface of the body portion 29a. The diameter of the flange portion 29b at an one-end-side end portion of the body portion 29a is greater than the inner diameter of the first insertion hole 40a of the bracket 24. The body portion 29a has a screw hole 29c on one end side in an axial direction as the lower side of the body portion 29a. The screw hole 29c extends toward the other end side of the body portion 29a in the axial direction not to penetrate the body portion 29a. That is, a terminal end of the screw hole 29c is positioned inside the body portion 29a. The bag nut 29 can be, through the screw hole 29c, screwed onto a tip end portion of the shaft portion 25a of the first bolt 25.

The method for assembling each member included in the slide device 10 will be described.

First, the second bolt 27 penetrates the second through-hole 30b of the load sensor 23. Accordingly, the head portion 27b of the second bolt 27 is housed in the enlarged-diameter portion 30c of the second through-hole 30b. Then, a tip end side of the shaft portion 27a of the second bolt 27 protrudes from the second through-hole 30b. The load sensor 23 is arranged at a predetermined position on the top wall 22a of the upper rail 22 such that the enlarged-diameter portion 30c housing the head portion 27b of the second bolt 27 is positioned on the lower side. Specifically, the load sensor 23 is arranged at such a position that the first through-holes 30a of the load sensor 23 each overlap with the attachment holes 22e of the top wall 22a of the upper rail 22. The first bolts 25 are, from the lower side of the top wall 22a, each inserted into the attachment holes 22e of the top wall 22a. Then, the shaft portions 25a of the first bolts 25 each penetrate the attachment holes 22e of the top wall 22a and the first through-holes 30a of the load sensor 23. Accordingly, a tip end side of each of the shaft portions 25a of the first bolts 25 protrudes from the first through-hole 30a. Subsequently, the first nuts 26 are each screwed onto the first bolts 25. Accordingly, the top wall 22a of the upper rail 22 and the load sensor 23 are sandwiched by the first bolts 25 and the first nuts 26. In this manner, the load sensor 23 is attached to the upper rail 22.

Next, the bracket 24 is arranged at a predetermined position on the load sensor 23. Specifically, the bracket 24 is arranged such that the shaft portion 27a of the second bolt 27 protruding from the load sensor 23 is inserted into the second insertion hole 40b of the bracket 24. Subsequently, the second nut 28 is screwed onto the second bolt 27. Accordingly, the bracket 24 and the load sensor 23 are sandwiched by the second bolt 27 and the second nut 28. In this manner, the bracket 24 is attached to the load sensor 23. The attachment wall 24a of the bracket 24 is substantially parallel to the top wall 22a of the upper rail 22. The portion of the attachment wall 24a around the second insertion hole 40b protrudes downward in the upper-lower direction DZ. Thus, only the portion of the attachment wall 24a around the second insertion hole 40b contacts the load sensor 23. As described above, the first bolt 25 and the first nut 26 are inserted into the first insertion hole 40a of the bracket 24 in non-contact with the attachment wall 24a of the bracket 24.

Next, the bag nut 29 is screwed onto the first bolt 25 at a position closer to the tip end side of the shaft portion 25a with respect to the first nut 26 screwed onto the first bolt 25 positioned on the rear end side of the upper rail 22 in the front-rear direction DY. The shaft portion 25a of the first bolt 25 contacts the terminal end of the screw hole 29c of the bag nut 29. Accordingly, the bag nut 29 is position-determined. When the bag nut 29 is position-determined, a predetermined clearance is formed between a lower surface of the bag nut 29 and an upper surface of the attachment wall 24a of the bracket 24 positioned on the lower side of the bag nut 29 in the upper-lower direction DZ. That is, the bag nut 29 attached to the first bolt 25 does not contact the attachment wall 24a of the bracket 24. In this state, the bag nut 29 is welded to the shaft portion 25a of the first bolt 25. In this manner, the first bolt 25 and the bag nut 29 are joined to each other.

The upper rail 22 to which the bracket 24, the load sensor 23, and the bag nut 29 are attached is attached to the lower rail 21. In this manner, each member included in the slide device 10 is assembled. The order of assembling each member is not limited to the above-described order. Each member can be assembled in an order changed as necessary.

Features of the present embodiment will be described.

As illustrated in FIGS. 2 and 6C, the first bolts 25 and the first nuts 26 are inserted into the first insertion holes 40a of the bracket 24 in non-contact with the attachment wall 24a of the bracket 24. Moreover, the bag nut 29 is attached to the first bolts 25 in non-contact with the attachment wall 24a of the bracket 24. Thus, the bracket 24 is attached to the load sensor 23 only with the second bolt 27 and the second nut 28. With this configuration, when a passenger sits on the seat 12, the load applied to the bracket 24 can be more accurately detected by the load sensors 23, for example.

Figure 7:
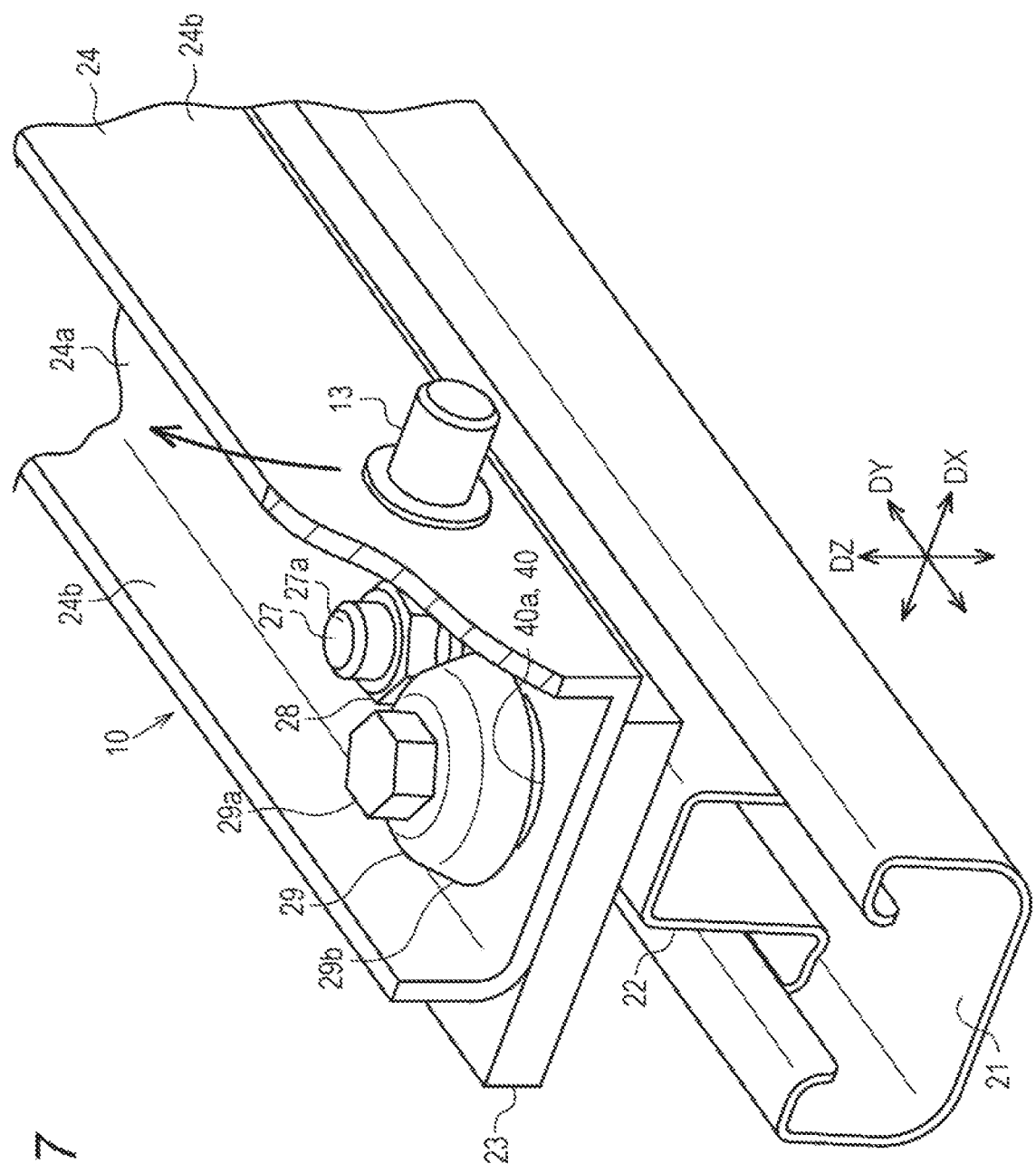
FIG. 7 is a perspective view of a rear end side of the slide device.

In FIG. 7, the load is applied in the direction of separating from the upper rail 22 on a rear end side of the bracket 24 in the front-rear direction DY, as indicated by an arrow. Then, the attachment wall 24a of the bracket 24 is easily deformable such that a rear end side of the attachment wall 24a of the bracket 24 in the front-rear direction DY is lifted upward in the upper-lower direction DZ. At this point, the lower surface of the flange portion 29b of the bag nut 29 comes into contact with the upper surface of the attachment wall 24a of the bracket 24. With this configuration, deformation of the bracket 24 can be reduced.

Advantageous effects of the present embodiment will be described.

(1) The bracket 24 has the first insertion holes 40a into which the first bolts 25 and the first nuts 26 are inserted in non-contact with the attachment wall 24a of the bracket 24. Moreover, the bag nut 29 is attached to the tip end portion of the shaft portion 25a of the first bolt 25 inserted into the first insertion hole 40a. The bag nut 29 reduces deformation of the bracket 24 in the direction of separating from the upper rail 22. The first attachment member has the first bolt 25 and the first nut 26 screwed onto the first bolt 25. Moreover, the bag nut 29 is attached to the tip-end-side position on the shaft portion 25a of the first bolt 25 with respect to the first nut 26.

As described above, the bag nut 29 as the deformation suppressing member is attached to the first bolt 25. With this configuration, the bag nut 29 can be attached utilizing an existing member of the slide device 10. Thus, the dimension of the slide device 10 in the longitudinal direction of the upper rail 22 can be decreased as compared to an aspect including another member provided for attaching the bag nut 29.

Moreover, the load sensor 23 is position-determined on and attached to the upper rail 22 by means of the first bolts 25 and the first nuts 26. Thereafter, the bracket 24 and the bag nut 29 can be attached. Thus, position determination of the load sensor 23 on the upper rail 22 can be suitably performed.

(2) The bag nut 29 having the non-penetrating screw hole 29c screwed onto the first bolt 25 is used as the deformation suppressing member. Thus, the terminal end of the screw hole 29c of the bag nut 29 are utilized for position determination of the bag nut 29 on the shaft portion 25a of the first bolt 25. Consequently, the bag nut 29 can be easily attached to a proper position.

(3) The load sensor 23 is attached to at least one end side of the upper rail 22 in the longitudinal direction thereof. At least one first attachment member is positioned on one end side of the upper rail in the longitudinal direction thereof with respect to the second attachment member. At a portion of the load sensor, which is at each end portion, from the second attachment member to the end portion of the upper rail in the longitudinal direction thereof, a greater load is more likely to be applied to the bracket in the direction of separating from the upper rail. Thus, deformation of the bracket 24 on easily-deformable one end side of the upper rail 22 can be suitably reduced.

Other Embodiments

The present embodiment may be modified as follows. The present embodiment and the following variations can be combined with each other as long as technical consistency is held.

The first attachment member is not limited to the first bolt 25 and the first nut 26. A member which can sandwich the upper rail 22 and the load sensor 23 and to which the deformation suppressing member can be attached can be employed as the first attachment member, as necessary. For example, the first attachment member may include a rod-shaped member having a flange, such as a nail, and an E-type or C-type retaining ring fitted in a groove provided at a predetermined position on the rod-shaped member. By an elastic member interposed on a lower surface of the retaining ring, the upper rail 22 and the load sensor 23 can be more suitably sandwiched. In this aspect, the deformation suppressing member also includes a similar retaining ring. With this configuration, the deformation suppressing member can be attached to the first attachment member. The second attachment member is also deformable as in the first attachment member.

Figure 8A:
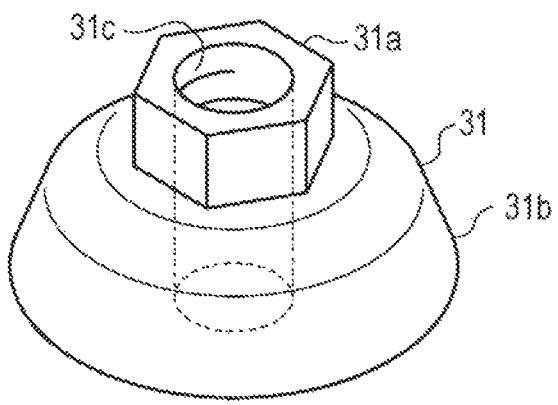
FIG. 8A is a perspective view of a deformation suppressing member of a variation.
Figure 8B:
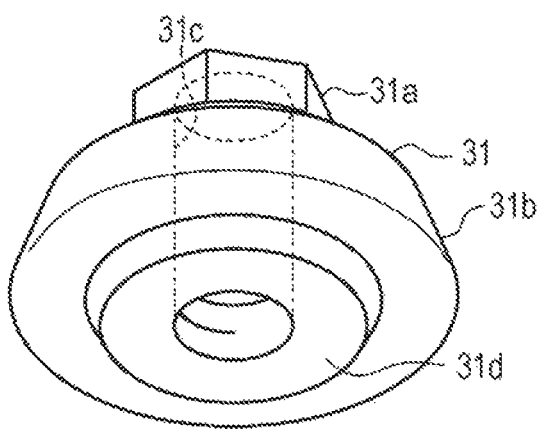
FIG. 8B is a perspective view of the deformation suppressing member of the variation from another angle.
Figure 8C:
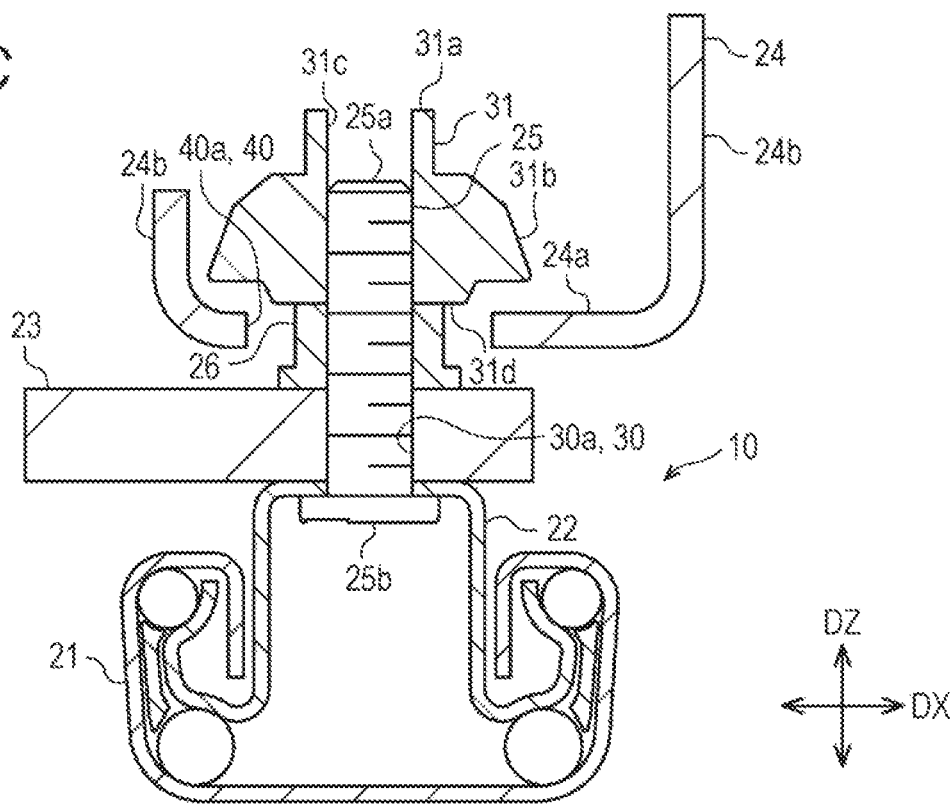
FIG. 8C is a sectional view of a slide device of the variation.
Figure 9:
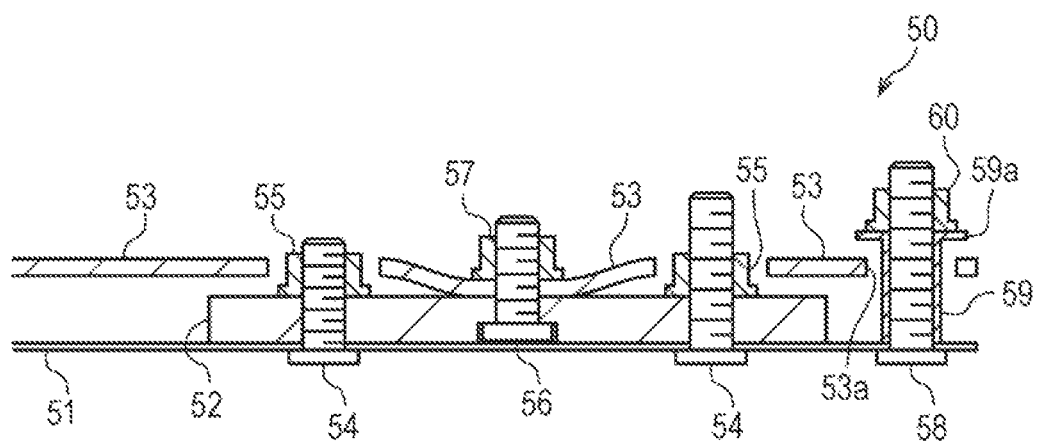
FIG. 9 is a sectional view of a slide device of a typical technique.

The deformation suppressing member is not limited to the bag nut 29 having the non-penetrating screw hole screwed onto the first bolt 25. For example, as illustrated in FIGS. 8A to 8C, a nut (hereinafter referred to as a "third nut 31") having a screw hole 31c penetrating the third nut 31 in an axial direction thereof may be used as the deformation suppressing member. The third nut 31 includes a columnar body portion 31a and a flange portion 31b protruding outward in a radial direction of the body portion 31a. That is, the third nut 31 having the screw hole 31c screwed onto the first bolt 25 and penetrating the deformation suppressing member may be used as the deformation suppressing member. In this aspect, the third nut 31 includes a protruding portion 31d protruding from a lower surface of the third nut 31 in the axial direction. The third nut 31 may be position-determined by the first nut 26 contacting the protruding portion 31d. The tip-end-side position of the first bolt 25 in the screw hole 31c can be checked from the outside. Thus, a screwing state of the deformation suppressing member can be easily checked. Moreover, the bag nut 29 can be easily welded to the shaft portion 25a of the first bolt 25.

In the present embodiment, the bag nut 29 is attached only to the rear-side first bolt 25 for the load sensor 23 attached to the rear end side of the upper rail 22 in the front-rear direction DY. Note that the present embodiment is not limited to this aspect. The first bolt 25 to which the bag nut 29 is attached can be selected as necessary. For example, the bag nut 29 may be attached to the front-side first bolt 25 for the load sensor 23 attached to a front end side of the upper rail 22 in the front-rear direction DY. Among these aspects, the bag nut 29 is preferably attached to the load sensor 23 at each of two end portions of the upper rail 22 in the front-rear direction DY. In this case, the bag nut 29 is attached to the first bolt 25 positioned on the end side of the upper rail 22 in the longitudinal direction thereof with respect to the second bolt 27 and the second nut 28. At each portion from the second bolt 27 and the second nut 28 to the end portion of the upper rail 22 in the longitudinal direction thereof, a greater load is more likely to be applied to the bracket 24 in the direction of separating from the upper rail 22. Thus, deformation of the bracket 24 can be more suitably reduced by the bag nut 29 attached to the first bolt 25 as described above.

In the present embodiment, the load sensors 23 are each attached to two end portions of the upper rail 22 in the front-rear direction DY. Note that the present embodiment is not limited to this aspect. The load sensor 23 may be attached only to one end side of the upper rail 22 in the front-rear direction DY.

In the present embodiment, the center one of three through-holes 30 provided at the load sensor 23 is used as the second through-hole 30b through which the second bolt 27 penetrates. Moreover, the remaining two through-holes 30 are used as the first through-holes 30a through which the first bolts 25 penetrate. Note that the present embodiment is not limited to this aspect. Other arrangements of the first through-hole 30a and the second through-hole 30h can be selected as necessary. Only one first through-hole 30a may be provided at the load sensor 23. Alternatively, three or more first through-holes 30a may be provided.

In the present embodiment, the first nut 26 and the bag nut 29 are directly screwed onto the first bolt 25. Note that a washer may be interposed between the nut and the bolt screwed to each other. Similarly, when the second nut 28 is screwed onto the second bolt 27, a washer may be also interposed between the bolt and the nut.

In the present embodiment, the first bolt 25 and the first nut 26 are inserted into the first insertion hole 40a in non-contact with the attachment wall 24a of the bracket 24. Note that the present embodiment is not limited to this aspect. The first bolt 25 and the first nut 26 may be, within such a range that influence on the load sensor 23 is acceptable, inserted into the first insertion hole 40a in contact with the attachment wall 24a of the bracket 24. Similarly, the bag nut 29 may also contact the attachment wall 24a of the bracket 24.

In the present embodiment, the first bolt 25 and the bag nut 29 are joined to each other by the bag nut 29 welded to the shaft portion 25a of the first bolt 25. Note that the present embodiment is not limited to this aspect. For example, the first bolt 25 and the bag nut 29 may be joined to each other with an adhesive. Alternatively, the bag nut 29 not welded to the shaft portion 25a of the first bolt 25 may be screwed onto and attached to the first bolt 25. That is, the bag nut 29 may be detachably attached to the first bolt 25.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:
1. A slide device comprising:
   a lower rail;
   an upper rail movably attached to the lower rail;
   a load sensor attached to the upper rail by a first attachment member; and
   a bracket attached to the load sensor by a second attachment member,
   wherein the bracket has an insertion hole into which the first attachment member is inserted,
   a deformation suppressing member is attached to a tip end portion of the first attachment member such that a portion of the bracket is disposed between the deformation suppressing member and the load sensor and the deformation suppressing member is separated from the portion of the bracket by a predetermined clearance,
   the first attachment member has a first bolt and a first nut screwed onto the first bolt, the tip end portion of the first attachment member is positioned on a tip end side of the first bolt with respect to the first nut, and the deformation suppressing member is configured to reduce deformation of the bracket in a direction of separating from the upper rail by coming into contact with the portion of the bracket when a load in the direction of separating from the upper rail is applied to the bracket.

2. The slide device according to claim 1, wherein the deformation suppressing member includes a bag nut having a non-penetrating screw hole screwed onto the first bolt.

3. The slide device according to claim 1, wherein the deformation suppressing member includes a nut having a penetrating screw hole screwed onto the first bolt.

4. The slide device according to claim 1, wherein the load sensor is attached to at least one end side of the upper rail in a longitudinal direction thereof, and the first attachment member is positioned on one end side of the upper rail in the longitudinal direction thereof with respect to the second attachment member.

5. A slide device comprising:
a lower rail;
an upper rail movably attached to the lower rail;
a load sensor attached to the upper rail by a first attachment member; and
a bracket attached to the load sensor by a second attachment member,
wherein the bracket has an insertion hole into which the first attachment member is inserted,
a deformation suppressing member is attached to a tip end portion of the first attachment member,
the first attachment member has a first bolt and a first nut screwed onto the first bolt,
the tip end portion of the first attachment member is positioned on a tip end side of the first bolt with respect to the first nut,
the deformation suppressing member is configured to reduce deformation of the bracket in a direction of separating from the upper rail, and
the deformation suppressing member includes a bag nut having a non-penetrating screw hole screwed onto the first bolt.

\* \* \* \* \*